(12) United States Patent
Pervan

(10) Patent No.: US 8,720,151 B2
(45) Date of Patent: May 13, 2014

(54) FLOORBOARDS FOR FLOORING

(71) Applicant: Valinge Innovation AB, Viken (SE)

(72) Inventor: Darko Pervan, Viken (SE)

(73) Assignee: Valinge Innovation AB, Viken (SE)

( * ) Notice: Subject to any disclaimer, the term of this patent is extended or adjusted under 35 U.S.C. 154(b) by 0 days.

(21) Appl. No.: 13/758,400

(22) Filed: Feb. 4, 2013

(65) Prior Publication Data
US 2013/0145707 A1 Jun. 13, 2013

Related U.S. Application Data

(63) Continuation of application No. 11/822,687, filed on Jul. 9, 2007, now Pat. No. 8,381,488, which is a continuation of application No. 10/510,580, filed as application No. PCT/SE03/00565 on Apr. 8, 2003, now Pat. No. 8,245,477.

(30) Foreign Application Priority Data

Apr. 8, 2002 (SE) ...................................... 0201059

(51) Int. Cl.
*E04F 13/10* (2006.01)
(52) U.S. Cl.
USPC ...................................................... 52/592.1
(58) Field of Classification Search
USPC ........ 52/177, 403.1, 392, 591.1, 592.1, 589.1
See application file for complete search history.

(56) References Cited

U.S. PATENT DOCUMENTS

| 1,925,068 A | 8/1933 | Gray |
| 1,995,264 A | 3/1935 | Mason |
| 2,026,511 A | 12/1935 | Storm |
| 2,113,076 A | 4/1938 | Bruce |
| 2,141,708 A | 12/1938 | Elmendorf |
| 2,149,026 A | 2/1939 | McBride |
| 2,269,926 A | 1/1942 | Crooks |
| 2,706,164 A | 4/1955 | Hervey |
| 2,740,167 A | 4/1956 | Rowley |
| 2,914,815 A | 12/1959 | Alexander |
| 3,234,074 A | 2/1966 | Bryant |
| 3,440,790 A | 4/1969 | Nerem |
| 3,548,559 A | 12/1970 | Levine |
| 3,888,061 A | 6/1975 | Kahr |
| 4,093,762 A | 6/1978 | Kiefer |
| RE30,233 E | 3/1980 | Lane et al. |

(Continued)

FOREIGN PATENT DOCUMENTS

| CA | 430631 A | 10/1945 |
| CA | 2 463 192 A1 | 10/2005 |

(Continued)

OTHER PUBLICATIONS

U.S. Appl. No. 13/738,401, Bergelin, et al.

(Continued)

*Primary Examiner* — Christine T Cajilig
(74) *Attorney, Agent, or Firm* — Buchanan Ingersoll & Rooney P.C.

(57) ABSTRACT

Floorboards for making a floating floor have a core (30) which includes at least two layers of material (L1, L2), which are arranged at different distances from the surface layer (31), and which differ in respect of material properties or material composition. Semi manufactures for making such floorboards are also disclosed.

10 Claims, 5 Drawing Sheets

(56) References Cited

U.S. PATENT DOCUMENTS

| | | | |
|---|---|---|---|
| 4,242,390 A | 12/1980 | Nemeth | |
| 4,471,012 A | 9/1984 | Maxwell | |
| 4,646,494 A | 3/1987 | Saarinen et al. | |
| 4,694,627 A | 9/1987 | Omholt | |
| 4,716,700 A | 1/1988 | Hagemeyer | |
| 5,103,614 A * | 4/1992 | Kawaguchi et al. | 52/392 |
| 5,349,796 A | 9/1994 | Meyerson | |
| 5,497,589 A | 3/1996 | Porter | |
| 5,540,025 A | 7/1996 | Takehara | |
| 5,755,068 A | 5/1998 | Ormiston | |
| 5,899,038 A | 5/1999 | Stroppiana | |
| 5,900,099 A | 5/1999 | Sweet et al. | |
| 5,968,625 A | 10/1999 | Hudson | |
| 6,006,486 A | 12/1999 | Moriau et al. | |
| 6,182,413 B1 | 2/2001 | Magnusson | |
| 6,209,278 B1 * | 4/2001 | Tychsen | 52/592.4 |
| 6,212,838 B1 | 4/2001 | Eda | |
| 6,247,285 B1 | 6/2001 | Moebus | |
| 6,332,733 B1 | 12/2001 | Hamberger et al. | |
| 6,505,452 B1 | 1/2003 | Hannig et al. | |
| 6,546,691 B2 | 4/2003 | Leopolder | |
| 6,591,568 B1 | 7/2003 | Palsson | |
| 6,606,834 B2 | 8/2003 | Martensson et al. | |
| 6,676,199 B2 * | 1/2004 | Buisson et al. | 296/193.07 |
| 6,679,011 B2 | 1/2004 | Beck et al. | |
| 6,722,809 B2 | 4/2004 | Hamberger et al. | |
| 6,786,019 B2 | 9/2004 | Thiers | |
| 6,804,926 B1 | 10/2004 | Eisermann | |
| 6,933,043 B1 | 8/2005 | Son et al. | |
| 2002/0059765 A1 | 5/2002 | Nogueira et al. | |
| 2003/0033777 A1 | 2/2003 | Thiers et al. | |
| 2003/0233809 A1 | 12/2003 | Pervan | |
| 2005/0208255 A1 | 9/2005 | Pervan | |
| 2008/0008871 A1 | 1/2008 | Pervan | |
| 2008/0028707 A1 | 2/2008 | Pervan | |

FOREIGN PATENT DOCUMENTS

| | | | |
|---|---|---|---|
| CH | 173818 | 12/1934 | |
| CH | 310904 | 11/1955 | |
| DE | 908 913 C1 | 4/1954 | |
| DE | 2 205 232 A1 | 8/1973 | |
| DE | 33 43 601 A1 | 6/1985 | |
| DE | 33 43 601 C2 | 6/1985 | |
| DE | 43 13 037 C1 | 8/1994 | |
| DE | 201 08 358 U1 | 9/2001 | |
| EP | 0 652 340 A1 | 5/1995 | |
| EP | 1 262 609 A1 | 12/2002 | |
| FR | 1.464.112 | 7/1966 | |
| FR | 2 718 175 A1 | 10/1995 | |
| GB | 291113 | 11/1928 | |
| JP | 2-194269 A | 7/1990 | |
| JP | 2-121236 U | 10/1990 | |
| JP | 5-21027 U | 3/1993 | |
| JP | 6-158831 A | 6/1994 | |
| JP | 6-280376 A | 10/1994 | |
| JP | 7-102745 A | 4/1995 | |
| JP | 07102745 A * | 4/1995 | E04F 15/04 |
| JP | 7-310426 A | 11/1995 | |
| JP | 08021071 A * | 1/1996 | E04F 15/04 |
| JP | 08068191 A * | 3/1996 | E04F 15/04 |
| JP | 8-300316 A | 11/1996 | |
| JP | 08300316 A * | 11/1996 | B27M 3/04 |
| JP | 9-38906 A | 2/1997 | |
| JP | 10-299230 A | 11/1998 | |
| JP | 10299230 A * | 11/1998 | E04F 15/04 |
| JP | 2000027418 A * | 1/2000 | E04F 15/04 |
| JP | 2000-226932 A | 8/2000 | |
| JP | 2001-145980 A | 5/2001 | |
| JP | 2001-329681 A | 11/2001 | |
| JP | 2003-027731 A | 1/2003 | |
| JP | 2003-080509 A | 3/2003 | |
| NL | 1008945 C1 | 10/1999 | |
| WO | WO 94/26999 A1 | 11/1994 | |
| WO | WO 96/27719 A1 | 9/1996 | |
| WO | WO 96/27721 A1 | 9/1996 | |
| WO | WO 97/47834 A1 | 12/1997 | |
| WO | WO 99/66152 A1 | 12/1999 | |
| WO | WO 00/66856 A1 | 11/2000 | |
| WO | WO 03/016655 A1 | 2/2003 | |
| WO | WO 03/087498 A1 | 10/2003 | |

OTHER PUBLICATIONS

U.S. Appl. No. 61/667,290, Pervan.
Bergelin, Marcus, et al., U.S. Appl. No. 13/738,401 entitled "A Lamella Core and a Method for Producing It," filed in the U.S. Patent and Trademark Office on Jan. 10, 2013.
Pervan, Darko, U.S. Appl. No. 61/667,190 entitled "Panel Forming," filed in the U.S. Patent and Trademark Office on Jul. 2, 2012.
Correspondence from Bütec cited during opposition procedure at EPO in DE Patent No. 3343601, including announcement of Oct. 1984 re "Das Festprogram von Bütec: Mehrzweckbühnen, tanzplatten, Schonbeläge, Tanzbeläge, Bestuhlung"; letter of Nov. 7, 2001 to Perstorp Support AB with attached brochure published Oct. 1984 and installation instructions published Nov. 1984; and letter of Nov. 19, 2001 to Perstorp Support AB.
Drawing Figures 25/6107 from Buetec GmbH dated Dec. 16, 1985.
International Search Report issued in PCT/SE03/00565, mailed Jun. 30, 2003, Swedish Patent Office, Stockholm, SE, 3 pages.
U.S. Appl. No. 13/870,224, Pervan, et al.
U.S. Appl. No. 13/932,406, Pervan.
Pervan, Darko, et al., U.S. Appl. No. 13/870,224, entitled "Building Panels of Solid Wood," filed in the U.S. Patent and Trademark Office on Apr. 25, 2013.
Pervan, Darko, U.S. Appl. No. 13/932,406, entitled "Panel Forming," filed in the U.S. Patent and Trademark Office on Jul. 1, 2013.

* cited by examiner

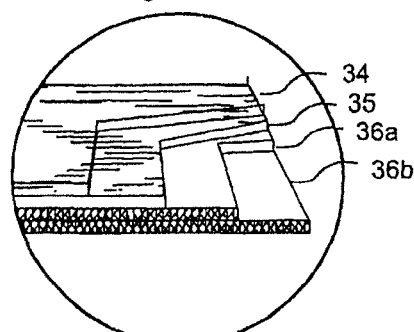
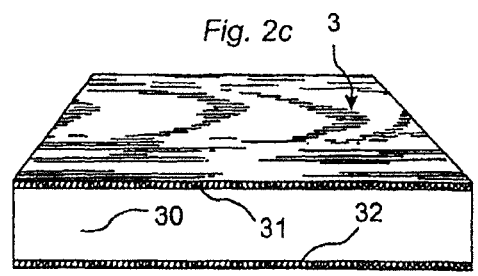
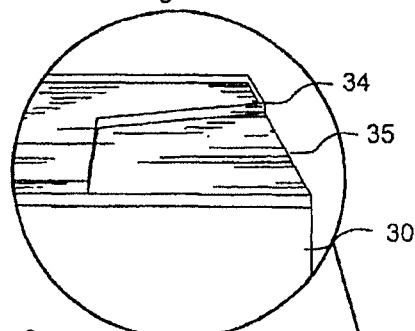
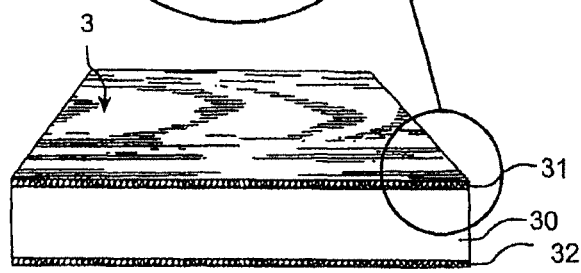

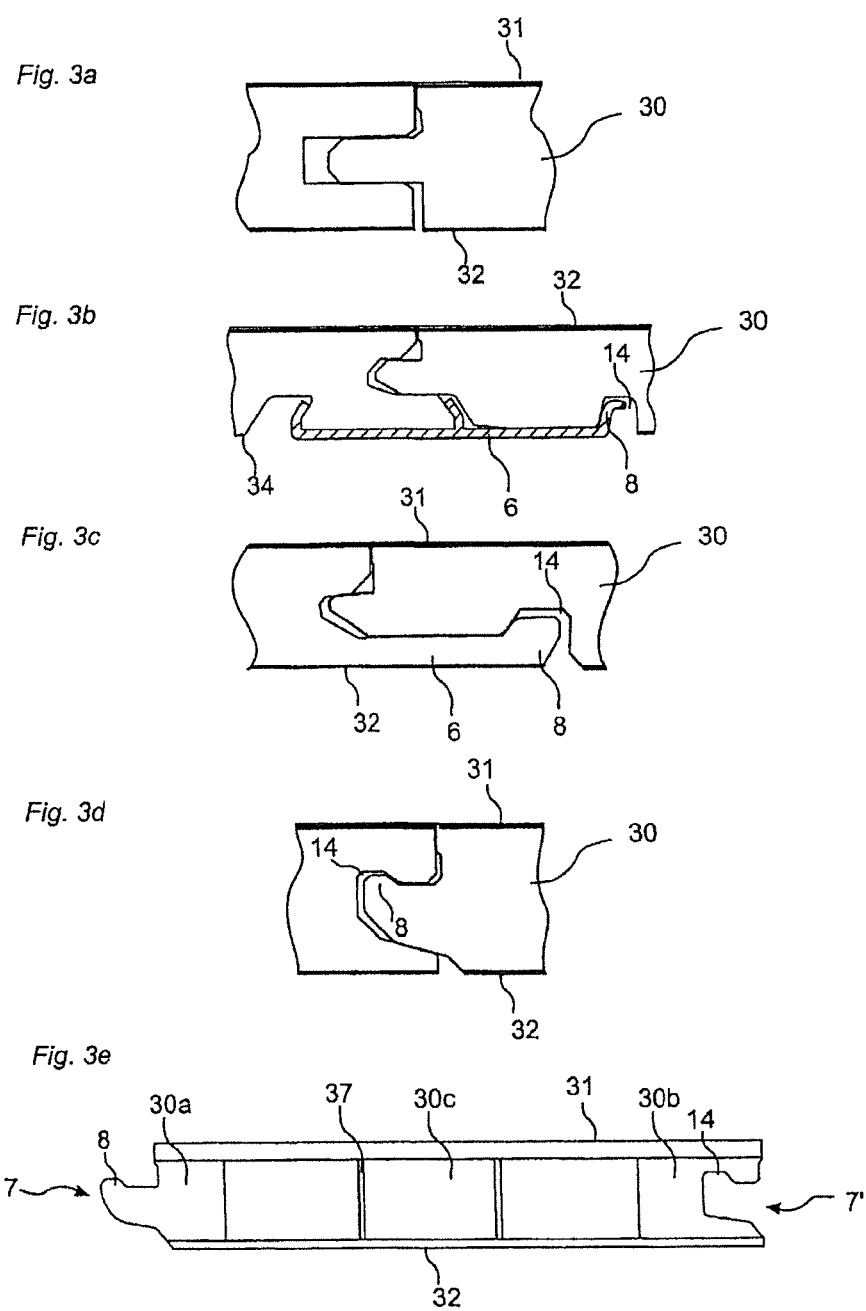

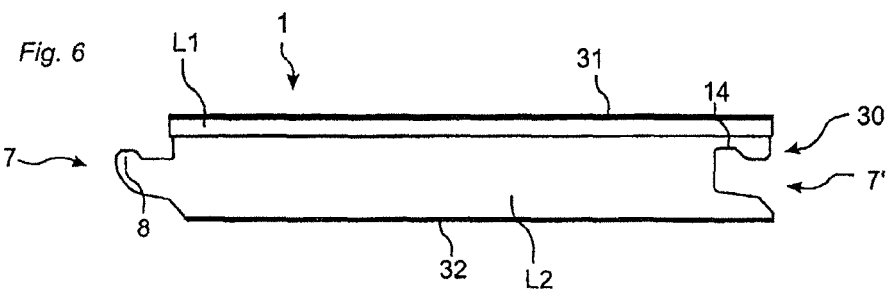
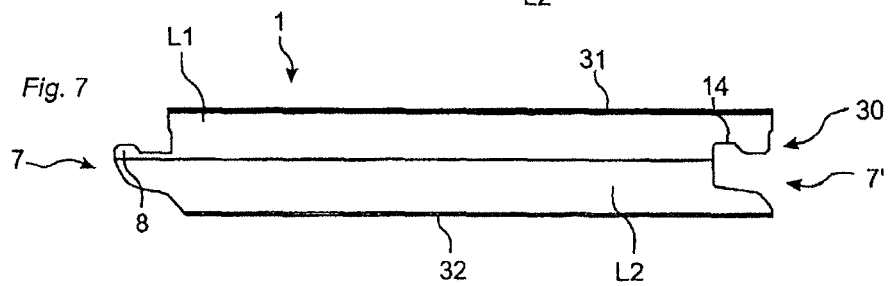
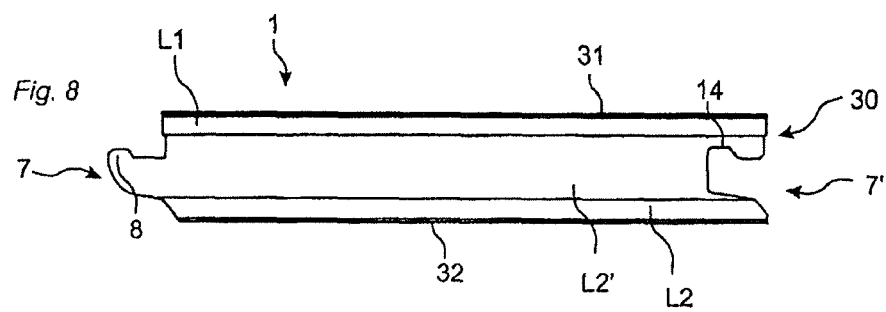
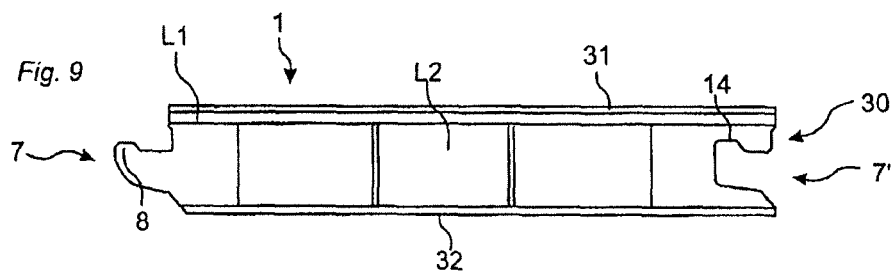

FLOORBOARDS FOR FLOORING

CROSS REFERENCE TO RELATED APPLICATIONS

The present application is a continuation of U.S. application Ser. No. 11/822,687, filed on Jul. 9, 2007, which is a continuation of U.S. application Ser. No. 10/510,580, filed on May 16, 2005, which is a national stage entry of Application No. PCT/SE03/00565, filed on Apr. 8, 2003, which claims the benefit of Swedish Application No. 0201059-3, filed on Apr. 8, 2002. The entire contents of each of U.S. application Ser. No. 11/822,687, U.S. application Ser. No. 10/510,580, Application No. PCT/SE03/00565, and Swedish Application No. 0201059-3 are hereby incorporated herein by reference in their entirety.

TECHNICAL FIELD

The invention generally relates to the field of core materials for floorboards. The invention relates to floorboards provided with such core materials, and floor elements of such core materials intended for making floorboards. The invention is particularly suited for use in floating floors such as laminate flooring as well as floorboards with a surface layer of veneer or wood, but is also usable in other similar floorings.

More specifically, the invention relates above all to floors of the type having a core and a decorative surface layer on the upper side of the core.

FIELD OF APPLICATION OF THE INVENTION

The present invention is particularly suitable for use in floating floors, which are formed of floorboards which are made up of surface layers of decorative laminate, veneer or decorative plastic material, an intermediate core of wood-fiber-based material and preferably a lower balancing layer on the rear side of the core. The following description of prior-art technique, problems of known systems and objects and features of the invention will therefore, as a non-restrictive example, be aimed above all at this field of application and in particular laminate flooring and wood flooring with a core of wood slates formed as rectangular floorboards intended to be mechanically joined on both long sides and short sides. However, it should be emphasized that the invention can be used in optional floorboards having a core and a decorative layer arranged on the core.

BACKGROUND OF THE INVENTION

Laminate flooring usually consists of a core of a 7 8 mm fiberboard, a 0.2 0.8 mm thick upper decorative surface layer of laminate and a 0.1 0.6 mm thick lower balancing layer of laminate, plastic, paper or like material. The surface layer provides appearance and durability to the floorboards. The core provides stability and helps, together with the surface layer, to give the floorboard sufficient impact strength. The balancing layer keeps the board plane when the relative humidity (RH) varies during the year. The floorboards are laid floating, i.e. without gluing, on the subfloor. Traditional hard floorboards in floating flooring of this type are usually joined by means of glued tongue-and-groove joints (i.e. joints involving a tongue on one floorboard and a tongue groove on an adjoining floorboard) on long side and short side.

In addition to such traditional floors, which are joined by means of glued tongue-and-groove joints, floorboards have recently been developed which do not require the use of glue and instead are joined mechanically by means of so-called mechanical locking systems. These systems comprise locking means which lock the boards horizontally and vertically. The mechanical locking systems are usually formed by machining of the core of the board. Alternatively, parts of the locking system can be formed of a separate material, such as aluminum, which is integrated with the floorboard, i.e. joined with the floorboard in connection with the manufacture thereof.

The main advantages of floating floors with mechanical locking systems are that they can easily and quickly by laid by various combinations of inward angling and snapping-in. They can also easily be taken up again and used once more at a different location. A further advantage of the mechanical locking systems is that the edge portions of the floorboards can be made of materials which need not have good gluing properties.

Laminate flooring and also many other floorings with a surface layer of plastic, wood, veneer, cork and the like are made by the surface layer and the balancing layer being applied to a core material.

The first generation laminate flooring, so-called HPL flooring, was made by providing a 6 mm thick particle board with a 0.8 mm surface layer of decorative high pressure laminate, usually referred to as HPL. HPL is made in a separate operation where a plurality of impregnated sheets of paper is compressed under high pressure and at a high temperature to a laminate board.

Later the second generation laminate flooring was developed, which is based on a more modern principle where both manufacture of the decorative laminate layer and the fastening to the fiberboard take place in one and the same manufacturing step. Impregnated sheets of paper are applied directly to the board and pressed together under pressure and heat without any gluing. As a rule, the surface layer is about 0.2 mm thick. This direct laminated flooring, usually referred to as DL flooring, whose main advantage is that the production cost is lower, was first inferior to HPL flooring owing to, inter alia, a lower degree of impact strength and lower moisture resistance. The quality properties of the DL flooring, however, were significantly improved when the particle board was replaced by a qualified HDF type fiberboard—high density fiberboard. The HDF board was considerably harder than the particle board and more resistant to moisture. Thus, the impact strength and moisture resistance of the DL flooring could be improved. As this HDF board was also being manufactured in increasingly larger volumes, the cost was reduced and DL flooring with an HDF core became number one on the market.

Although the particle board is considerably cheaper than HDF, the DL technology combined with HDF is altogether less expensive. DL flooring now had quality properties equivalent to those of HPL flooring but was at the same time essentially less expensive.

At this time when DL flooring was being sold in larger quantities than HPL flooring, the laminate flooring was joined using a traditional locking system consisting of tongue, groove and glue. HPL flooring with a core of particle board was easier to glue than DL flooring with a core of HDF. When the mechanical joint systems were developed, also this problem was eliminated, and in a short time DL flooring with a core of HDF captured 90% of the market.

In addition to the above two methods, a number of other methods are used to manufacture floating floors and provide different core materials with a surface layer. A decorative pattern can be printed on the surface of the core, which is then, for example, coated with a wear layer. The core can also be provided with a surface layer of wood, veneer, decorative paper or plastic sheeting, and these materials can then be coated with a wear layer.

As a rule, the above methods result in a floor element in the form of a large board which is then sawn into, for instance, some ten floor panels, which are then machined to floorboards.

In all cases, the above floor panels are individually machined along their edges to floorboards. The machining of the edges is carried out in advanced milling machines where the floor panel is exactly positioned between one or more chains and bands mounted, so that the floor panel can be moved at high speed and with great accuracy past a number of milling motors, which are provided with diamond cutting tools or metal cutting tools, which machine the edge of the floor panel. By using several milling motors operating at different angles, advanced joint geometries can be formed at speeds exceeding 100 m/min and with an accuracy of ▨ 0.02 mm.

JP-20011329681 discloses a floorboard having a multi-layer core and a surface layer comprising wood veneer and a vapor proof layer arranged between the veneer and the core. The core comprises a middle layer of plywood and upper and lower layers of MDF.

Definition of Some Terms

In the following text, the visible surface of the installed floorboard is called "front side", while the opposite side of the floorboard, facing the subfloor, is called "rear side". The sheet-shaped starting material that is used is called "core". When the core is coated with a surface layer closest to the front side and preferably also a balancing layer closest to the rear side, it forms a semi-manufacture which is called "floor panel" or "floor element" in the case where the semi-manufacture, in a subsequent operation, is divided into a plurality of floor panels mentioned above. When the floor panels are machined along their edges so as to obtain their final shape with the joint system, they are called "floorboards". By "surface layer" are meant all layers applied to the core closest to the front side and covering preferably the entire front side of the floorboard. By "decorative surface layer" is meant a layer which is mainly intended to give the floor its decorative appearance. "Wear layer" relates to a layer which is mainly adapted to improve the durability of the front side. In laminate flooring, this layer as a rule consists of a transparent sheet of paper with aluminum oxide added, which is impregnated with melamine resin. By "reinforcement layer" is meant a layer which is mainly intended to improve the capability of the surface layer of resisting impact and pressure and, in some cases, compensating for the irregularities of the core so that these will not be visible at the surface. In high pressure laminates, this reinforcement layer usually consists of brown kraft paper which is impregnated with phenol resin.

By laminate flooring is meant a floor board with a surface layer of a thermosetting laminate comprising one or more paper sheets impregnated with a thermosetting resin. A core consisting of wood slates which are glued to a surface and balancing layer of wood is called "lamella core". The slates have a fiber orientation which is perpendicular to the fiber orientation of the surface and balancing layers.

The outer parts of the floorboard at the edge of the floorboard between the front side and the rear side are called "joint edge". As a rule, the joint edge has several "joint surfaces" which can be vertical, horizontal, angled, rounded, beveled etc. These joint surfaces exist on different materials, for instance laminate, fiberboard, wood, plastic, metal (especially aluminum) or sealing material. By "joint edge portion" are meant the joint edge of the floorboard and part of the floorboard portions closest to the joint edge.

By "joint" or "joint system" are meant coacting connecting means which connect the floorboards vertically and/or horizontally. By "mechanical locking system" is meant that the joining can take place without glue horizontally parallel to the surface and vertically perpendicular to the surface. Mechanical locking systems can in many cases also be joined by means of glue which could be applied in the joint or between the rear side and the subfloor. By "floating floor" is meant a floor with floorboards which are only joined along their respective joint edges and thus not glued to the subfloor. In connection with movement due to moisture, the joint remains sealed. Movement due to moisture takes place in the outer areas of the floor along the walls concealed under the base boards. By "HDF" are meant board materials that are referred to on the market as high-density fiberboard. HDF consists of ground wood fibers joined by means of a binder. By particle board is meant a board material comprising wood particles joined by means of a binder.

The above techniques can be used to manufacture laminate floorings which are highly natural copies of wooden flooring, stones, tiles and the like and which are very easy to install using mechanical joint systems. The length and width of the floorboards are as a rule 1.2*0.2 m and the thickness is as a rule 7-8 mm.

Recently also laminate flooring with other formats and other thicknesses have been introduced on the market. Formats having a length of 1.2 m, a width of 0.4 m and a thickness of about 11 mm are used, for instance, to imitate stones and tiles. Laminate floor may also be produced in lengths of 1.8-2.4 m and widths of 0.2 m. All such floorboards will be heavy and difficult to handle in connection with transport and installation since HDF has a density of about 900 kg/m3, Besides the cost of material for an 11 mm HDF core is high. There is thus a great need to lower the cost and also the weight of the core in a thick or large laminate flooring board, but also in laminate flooring of normal thickness. The same applies to similar flooring having other surface layers such as veneer, plastic etc. For parquet flooring with a surface layer of 2-3 mm hardwood and a lamella core, the cost of the surface layers is considerable. The market for floating floors could increase significantly if the cost of the floorboard could be lowered and if the weight could be reduced.

Laminate flooring has a hard surface layer which produces a high sound level in the room as people walk on the floor, wearing shoes. This is a disadvantage that reduces the possibility of using the floor especially in public surroundings.

Prior-Art Technique and Problems Thereof

To facilitate the understanding and description of the present invention as well as the knowledge of the problems behind the invention now follows with reference to FIGS. 1-3 in the accompanying drawings.

FIGS. 2a-2c show manufacture of an HPL flooring. A wear layer 34 of a transparent material with great wearing strength is impregnated with melamine with aluminum oxide added. A decorative layer 35 of paper impregnated with melamine is placed under this layer 34. One or more reinforcing layers 36a, 36b of core paper impregnated with phenol are placed under the decorative layer 35 and the entire packet is placed in a press where it cures under pressure and heat to an about 0.5 0.8 mm thick surface layer 31 of high pressure laminate (HPL). FIG. 2c shows how this surface layer 31 can then be glued together with a balancing layer 32 to a core 30 to constitute a floor element 3. Due to the separate gluing operation, HPL flooring may be produced with a variety of different core materials such as HDF, particle boards and plastic material sheets. All HPL floors are however produced with a core of one material only.

FIGS. 2d and 2e illustrate manufacture of a DL flooring. A wear layer 34 in the form of an overlay and a decorative layer 35 of decoration paper is placed directly on a core 30. All three parts and, as a rule, also a rear balancing layer 32 are then placed in the press where they cure under heat and pressure to a floor element 3 with a decorative surface layer 31 having a thickness of about 0.2 mm. Direct laminate has usually no reinforcing layer. The capability of the laminate edge to resist impact and moisture is quite dependent on the properties of the core material. Therefore use is made of a high quality material with high density and moisture resistance such as HDF. The cost of material for HDF is significantly higher than that for particle board. The production method of direct lamination is a factor that limits the possibilities to use various core materials since the decorative layer is fixed to the core by the melamine resins in the decorative paper. The resin penetrates into the wood fibers of an HDF material and binds the surface layer to the core. The majority of all DL floors are produced with a HDF core. Some low quality floors are produced with a core of MDF or particle board. All DL floors however are based on a core made of a single material.

FIG. 3a shows an example of a traditional laminate or veneer flooring with a surface layer 31 of, for instance, direct laminate (DL) or 0.6 mm veneer, a core 30 of HDF and a balancing layer 32 of laminate or veneer that are joined by tongue, glue and joint. FIG. 3b shows an example of a laminate flooring with a surface 31 of HPL, a core of HDF and a mechanical locking system which consists of a strip 6 and a locking element 8 of aluminum and which coacts with a locking groove 14 formed in the core 30. In order to fix the strip to the core and to reach sufficient locking strength, the core is generally made of HDF.

FIG. 3c shows an example of a laminate flooring with a surface 31 of DL, a core 30 of HDF and a mechanical locking system 6, 8, 14 which has been formed from the core 30 of the floorboard. A core of HDF is in this case necessary for the locking system to obtain the required strength and function. The surface layer 31 could be wood or HPL. A wood surface could be combined with a core of HDF or plywood consisting of different wood layers which may be made of different wood materials.

FIG. 3d shows an example of a laminate flooring with a surface 31 of DL, a core of HDF and a mechanical joint system with a locking element 8 and a locking groove 14 in the upper part of the tongue groove.

FIG. 3e shows a parquet flooring, seen from the long side, with a thickness of about 15 mm, which has a surface layer 31 of e.g. 3 mm oak. The core consists in this example of different kinds of wood. A harder kind of wood 30a, 30b is to be found at the joint edge portions forming the mechanical locking system 7, 7'. Between these joint edge portions, the core 30 consists of wood slats 30c made of a soft and inexpensive kind of wood. The slats 30c are joined with the surface layer 31 and the balancing layer 32 by gluing. They often contain knots, cracks and the like. The surface layer 31 of wood must have a sufficient thickness to bridge these irregularities as well as the joints 37 between the slats 30c of the core. Such a lamella core is generally less expensive than an HDF core and gives a more stable floor board.

These floorboards suffer from a number of problems which are above all related to cost and function.

The HDF core that is required to give a laminate flooring or veneer flooring sufficient impact resistance in the surface and at the joint edges has substantially the same high quality in the entire floorboard. The density of a HDF core might vary between the parts closest to the surface and some other parts in the centre of the core but all parts contain the same type of wood fibers and binders. This overall high quality is not necessary, for instance, in the inner and rear parts of the floorboard.

Penetration of moisture into a floorboard takes place above all in the upper portions of the joint edge closest to the surface and it is in these portions that the HDF material is necessary. In the other portions of the floorboard, lower quality properties would be sufficient.

To be able to form a mechanical locking system with projecting parts, the joint edge and thus also the core of the floorboard must as a rule be of good quality. Also in this context, the high quality is only necessary in certain parts of the joint edges.

A parquet flooring with a lamella core has a wear layer of about 3 mm. This is needed above all to give the surface sufficient impact strength and to bridge the spaces between the wood slats of the core so as to prevent them from telegraphing through the surface layer and becoming visible in the surface. The surface layer is currently protected by a strong varnish and regrinding takes place only rarely or not at all. Consequently, the thickness of the wear layer could be reduced if the remaining problems could be solved.

The above problems result in a high cost of material and a high weight. The hard surface produces an undesirable sound level.

To counteract these problems, different methods have been employed. The main method is to reduce quality and density of the HDF board. DL flooring is also made with a particle board as core material. These methods result in a lower cost and a lower weight, but at the same time the impact strength is insufficient, the boards are sensitive to moisture and the mechanical joint systems have low strength and a poor function.

Parquet flooring is made with a core of particle board, HDF or plywood. As a rule, these materials are more expensive than a core of slats. A core of slats also reduces the board's movement due to moisture better than other board materials since the slats of the core are placed perpendicular to the longitudinal direction of the board. This means that the fiber direction of the slats is perpendicular to the fiber direction of the surface layer. Such a fiber orientation is favorable to counteract movement caused by moisture.

To reduce the sound level, floating laminate flooring is installed on a sound-absorbing layer of plastic foam, rag paper, textile fiber and the like. These layers have also been glued to the balancing layer of the rear side. This form of sound absorption yields a poor result and the cost is high.

Brief Description of the Invention and Objectives Thereof

The object of the present invention is to eliminate or significantly reduce one or more of the problems occurring in connection with manufacture of floating floorboards and in particular such floorboards with mechanical joint systems. The problems are mainly solved with a core made of at least two layers of different materials or same materials but with different properties.

Different types of wood such as oak, pine, cork etc. and different board types such as MDF, HDF, particle board, plywood, plastic etc. are regarded as different materials.

These different materials are defined as having different material composition. Same type of material may have different properties if for instance density, strength, flexibility and moisture resistance properties are different.

The density in a wood fiber based material such as HDF might vary in different parts. Such variations in a layer should not be regarded as different properties if the whole layer consist of the same type of fibers, binders etc.

The invention is based on the first knowledge that the core should be made of different layers consisting of different materials or of the same material but with different properties. This allows the cost of material to be reduced while at the same time the other properties of the floorboard, such as impact strength and moisture resistance, can be unchanged.

The invention is based on the second knowledge that a core material with different layers can provide a lower weight without impairing the other quality properties.

The invention is based on the third knowledge that a core material with different layers can produce better sound properties.

Finally, the invention is based on the fourth knowledge that a core material consisting of different layers allows manufacture of floorboards with mechanical locking systems having a high quality while at the same time the cost can be reduced.

The invention is particularly suited for use in floating floors consisting of floorboards whose core contains layers of wood fibers, such as wood slats, solid wood, cork, particle board, MDF, HDF, compact laminate, plywood and the like. Such board materials can easily be glued to each other in different layers and they may, for instance, by impregnating with suitable chemicals, be given improved properties, for instance regarding density, impact strength, flexibility, moisture resistance, friction and the like. In this way, optimal board materials can be manufactured and combined as regards function and cost level of the floorboard and the joint system. Wood-fiber-based materials can be formed to advanced geometries by cutting. The core may also consist of different plastic materials, rubber materials and the like, which can also be combined with different wood-fiber-based materials. All the core materials described above can be formed to floorboards having different types of known mechanical locking systems.

The invention is also particularly suited for use in laminate floorings and parquet floorings with a lamella core.

Thus, a large number of combinations of different floorboards, locking systems, materials and formats can be provided.

The above related objectives are obtained by respective floorboards and semi manufactures according to the appended independent claims. Embodiments of the invention are set forth in the dependent claims, in the description and in the drawings.

According to a first aspect of the invention, a floorboard for making a laminate flooring is provided. The floorboard has a core and a surface layer comprising a thermosetting resin, arranged on an upper side of the core. The floorboard is distinguished in that the core comprises at least two joined layers of material, which are arranged at different distances from the surface layer, and which differ in respect of material properties or material composition, and in that a first core layer, closest to the surface layer, comprises HDF or MDF.

According to a second aspect of the invention, a semi manufacture for making the above related laminate floorboard is provided.

Through the first and second aspects of the invention, laminate floorboards are provided, which enables a reduction of the cost of laminate floorings by combining the advantages of an HDF or MDF core with respect to durability and impact strength with the cost advantages associated with a less costly floorboard material, such as particle board. In particular embodiments of the invention, the floorboard may have a an upper layer of high-quality HDF and a lower layer of e.g. MDF or particle board.

According to a third aspect of the invention a floorboard for making a wood flooring is provided. The floorboard has a core comprising wood lamellae and a surface layer arranged on an upper side of the core. The core comprises at least two layers of material, which are arranged at different distances from the surface layer, and which differ in respect of material properties or material composition. The core layer closest to the surface layer comprises HDF or MDF, and the surface layer is a wood veneer, which is arranged on said HDF or MDF layer.

According to a fourth aspect of the invention, a semi manufacture for making the above related wood floorboard is provided.

Through the third and fourth aspects of the invention, the cost of floorboards having a real wood surface and core may be reduced. According to the invention, the amount of wood needed for providing a wood surface, which may be reground may be reduced, while maintaining the floorboard's properties with respect to impact strength.

The invention will now be described in more detail, with reference to the appended drawings, which show exemplifying embodiments of the invention.

BRIEF DESCRIPTION OF THE DRAWINGS

FIGS. 2a-e illustrate the composition of laminate flooring with a surface of high pressure laminate and direct laminate.

FIGS. 3a-e illustrate examples of different floorboards.

FIGS. 6-9 illustrate different embodiments of the invention.

DESCRIPTION OF EMBODIMENTS OF THE INVENTION

Figure 1A:
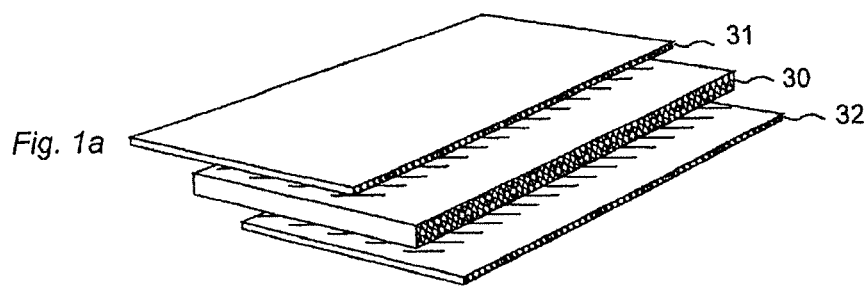
FIGS. 1a-d illustrate in different steps manufacture of a floorboard.
Figure 1B:
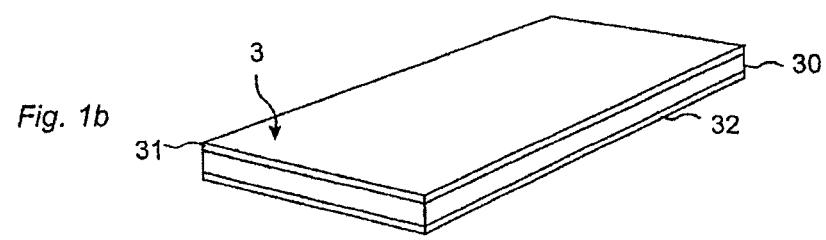
Figure 1C:
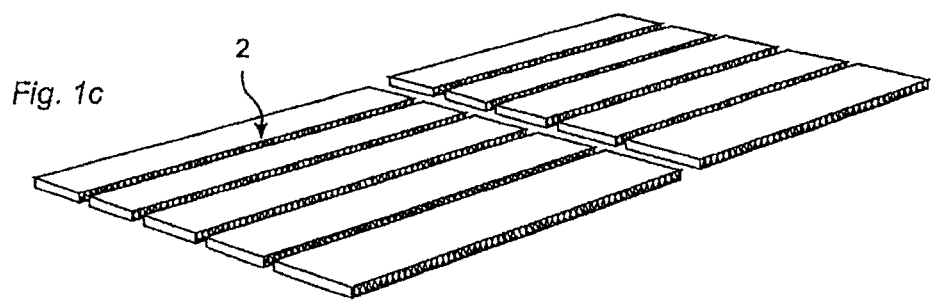
Figure 1D:
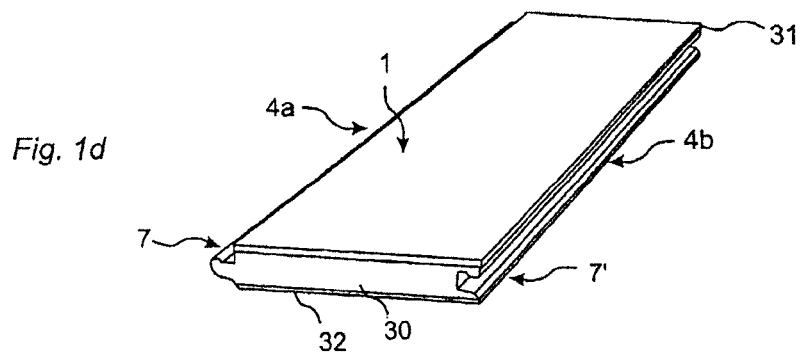
Figure 4A:
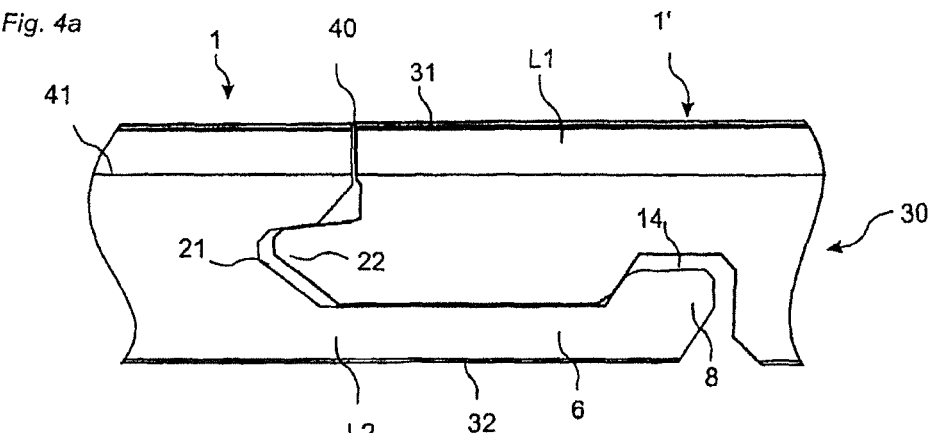
FIGS. 4a-b illustrate floorboards according to different embodiments of the invention.

FIG. 4a illustrates a preferred embodiment of the invention. The floorboard 1 can be, for instance, a laminate or veneer floor. The thickness can be, for instance, 6 12 mm. In the embodiment illustrated, the floorboard 1 has a surface layer 31 of direct laminate DL, a balancing layer 32 of DL and a core 30 which consists of two layers L1 and L2. The upper layer L1 closest to the surface can, for instance, be made of HDF having high density and moisture resistance. The lower layer L2 can, for instance, be made of a lower quality of HDF, of MDF or of other wood-fiber-based board materials. A preferred alternative is particle board. The two layers of material are preferably joined by gluing. In this embodiment there is thus a glue layer 41 between L1 and L2. Such a floor will have good properties in the upper parts closest to the surface. Upper joint edges 14 will have high impact strength, and moisture penetrating between the joint edges will not cause much problems. The lower layer L2 of the core may consist of, for instance, a less expensive material, such as particle board of low density. In this manner, the floorboard will have good properties while at the same time it can be manufactured at a low cost. The weight will also be lower. By making the core of two materials L1 and L2, the savings in cost that are made in the lower layer can be used to increase the quality of the upper. The floorboards 1, 1' can also be made thicker and more stable with unchanged weight and cost. The sound level can be reduced by the floorboard having a different sound frequency which is felt to be more pleasant. The sound level can also be reduced by choosing suitable materials in the core. Another alternative to reduce the sound is to glue down the floor board to the sub floor. In this case a mechanical locking system could be used to position the floor boards and to keep them together until the glue cures. If a flexible glue is used which allows some movement of the floor bards relative the sub floor, a semi floating floor could be accomplished with a low sound and tight joints.

Figure 4B:
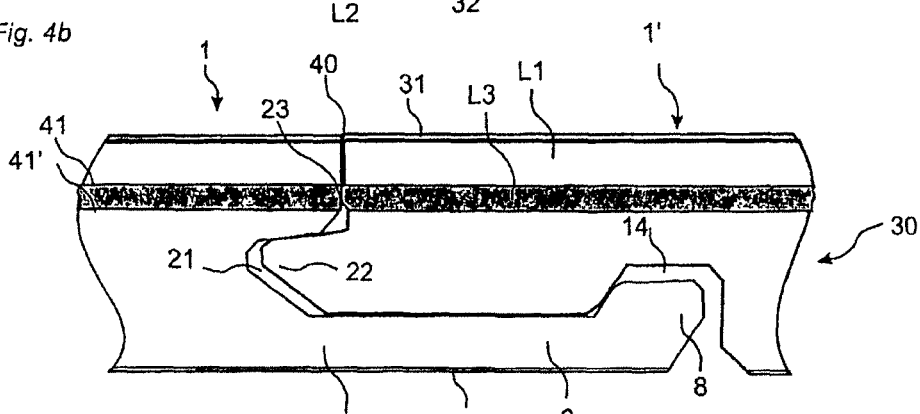

FIG. 4b illustrates a floorboard with a core consisting of 3 layers. The surface layer 31 may be laminate or wood or any other surface material suitable for flooring. L1 and L2 may be made of HDF. L3 may be a softer and more flexible material than the upper layer L1 such natural or artificial rubber, rubber-like material (e.g. thermoplastic elastomers), plastic foam, textiles, non-wovens or cork. Other sound reducing or absorbing materials may also be used. Such a floor board will reduce sound much better than a traditional laminate flooring. A cork layer combined with an upper layer L1 of HDF and a laminate surface, especially a direct laminated surface 31 is a preferable material. It is easy to glue cork to HDF and cork can stand the heat and pressure resulting from the lamination. The sound reduction could be of a considerable degree if the sound reducing layer L3 is placed closed to the surface layer. A preferable embodiment is a floor board with a sound reducing layer L3 in the upper part of the core above the vertical locking means 21 and 22, which in the illustrated embodiment is a groove 21 and a tongue 22.

If the layer L3 is made of a flexible and water proof material such as rubber or foam, it could be used to form a joint sealing 23 which prevents water from penetrating through the locking system. The layer L3 could also be used to include special properties into a laminate flooring. Plastic layers which create heat when connected to electricity may be used to produce floorboards with floor heating systems integrated into the core close to the floor surface. The mechanical locking system could be formed to automatically connect the heating layers in two floorboards with each other. Other advanced features may in a similar way be integrated into the core such as layers which activate alarm systems when a person walks over the floor. All these feature could be combined with a direct lamination production method where the lamination is made against an appropriate wood fiber based material such as HDF. The lower layer L2 could of course be made of other materials than HDF.

According to the invention, floor elements can be made by, for instance, board materials of HDF and particle board being glued to a core consisting of two or more layers of material L1 and L2. The HDF board is ground in the normal manufacture so as to obtain an even surface and uniform thickness. Such grinding may wholly or partly take place according to the invention after gluing of the layers L1, L2, L3. In this way, a saving in material can take place by a smaller amount of material or less expensive material being removed by grinding. After gluing of the core, lamination or gluing of the surface layer takes place. If the layers of material of the core have the correct thickness even before gluing, gluing of the layers of material L1, L2 of the core as well as the surface layer 3 and the balancing layer 32 can take place in one and the same operation. It is also possible to combine direct laminating with gluing of the layers of material of the core by gluing taking place using methods that allow complete or partial activation of layers of glue using the pressure and heat that arise in connection with direct laminating.

Figure 5:
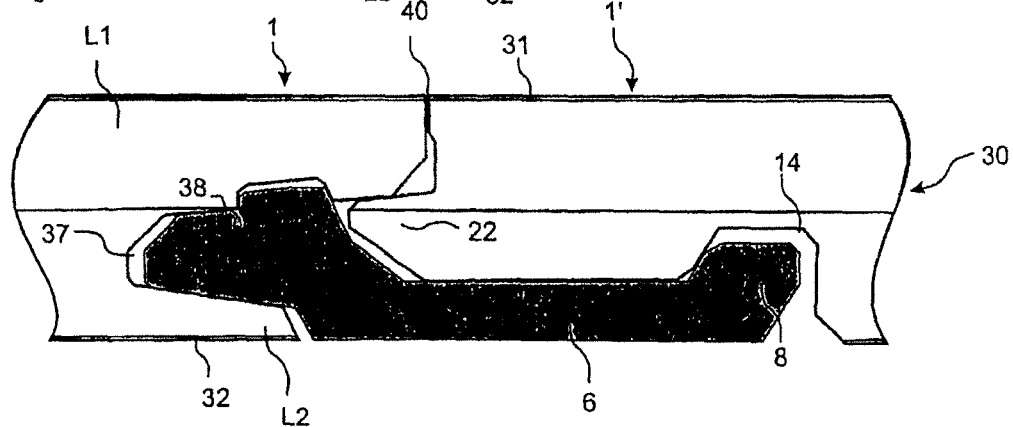
FIG. 5 illustrates an alternative embodiment of a floorboard according to the invention.

The upper layer of material L1 can be used in the mechanical joint system as illustrated in FIGS. 5 and 7. In FIG. 5 a separately machined strip 6 of, for instance, HDF material has been joined with the core by snapping-in or angling of the strip tongue 38 into the strip groove 37. This joining can take place in softer materials such as particle board, but the strength may be higher if the mechanical joining takes place with, for instance, HDF material. The strip tongue 38 has in the upper part locking means and positioning surfaces which lock the strip 6 horizontally and vertically to the floorboard 1. As an alternative, the strip 6 can also be constructed so as to allow fastening by the strip tongue 38 being angled into the strip groove 37 by an angular motion either from above or from below, but this results in a more complicated fastening method than snapping-in. The strength of the mechanical locking system may be lower. In this embodiment according to FIG. 5, also the tongue 22 of the second floorboard 1' is positioned vertically between two HDF materials, which facilitates lateral displacement in the locked position. This is an important mechanical locking of long and short sides of rectangular floorboards.

FIG. 6 shows an example of an embodiment of a floorboard according to the invention which has a relatively thin layer of a hard and moisture-proof material L1 closest to the surface layer (31).

FIG. 7 shows an example of an embodiment according to the invention of a board 1 with a core 30 having two materials L1 and L2 of similar thickness. The upper layer of material L1 has been selected so that the locking system 7, 7' and its locking means 8, 14 are made of this material.

FIG. 8 shows an example of the condition that the core 30 may consist of three layers of material L1, L2 and L2'. The layer of material L1 closest to the surface 31 and the lower layer of material L2 closest to the balancing layer 32 can preferably be identical. This may facilitate balancing of the board so that it keeps plane as relative humidity varies. A mechanical locking system with a strip in the lower part according to FIG. 4 can be made of this material L2. Moreover, the upper and lower layers of material L1, L2 may be adjusted so as to facilitate laminating or gluing of surface layer and balancing layer. In this manner, the material L2' may be selected in the center layer of the core, which need not be capable of laminating or easy to glue in a normal gluing process.

FIG. 9 shows an example of a floorboard 1 which constitutes a parquet floor according to a preferred embodiment of the invention. The surface layer 31 consists in this embodiment of a wood layer which is thinner than the traditional wood layers. These traditional wood layers are as a rule 2-3 mm. According to the invention, the surface layer 31, which consists of hard and expensive high-grade wood, can be made with a reduced thickness, for instance about 1 mm. This thickness is sufficient to allow regrinding. The varnish systems are today so advanced that regrinding is in fact not necessary. The remaining part of the wood layer 31, which is actually only necessary to bridge the irregularities of the core of slats, can be provided with a considerably less expensive and better material L1, for instance HDF. The surface layer 31 of high-grade wood has thus according to the invention been replaced by a thin layer of wood and a high quality but less expensive material such as HDF. We have discovered that in particular HDF with high density is a most convenient material to replace high-grade wood in parquet flooring with a lamella core. Such a surface layer, which thus consists of a thin layer of high-grade wood and a core layer of an advanced board material, can be manufactured so that, compared with traditional surface layers of high-grade wood, it will have a better possibility of bridging their irregularities of the core of slats, be more stable and make less movements caused by moisture in case of variations in relative humidity. This can be achieved in combination with a lower cost of material.

Several variants are feasible within the scope of the invention. The number of layers of material in the core can be more than three. The thickness of the different layers may vary. Special HDF materials can be manufactured using a significantly larger amount of binder and with an increased density exceeding 1200 kg/m3, Particle boards with special binders and particle sizes can be manufactured so that they are optimally adjusted to interact with HDF in wood or laminate flooring. Basically, all wood-based board materials can be used that are normally to be found in the building and furniture industry. The invention is not limited to thin floors. According to the principles of the invention, laminate flooring can be manufactured in thicknesses exceeding 12 mm, for instance 14-15 mm or more, and with a competitive cost structure and weight. Such thick laminate flooring will as a rule have a more pleasant sound level, which may bridge great irregularities in the subfloor. They may be made very rigid and could be used as sports floors. The invention can also be used for floorboards without a balancing layer and on floorboards which are not laid floating but which are glued to the subfloor.

The invention claimed is:

1. A floorboard for making a laminate flooring, the floorboard having a core and a surface layer arranged on an upper side of the core, the core comprising at least a first core layer and a second core layer, and the surface layer comprising a thermosetting resin, and connectors, arranged along at least two opposite edge portions of said floorboard, adapted to lock said floorboard with a substantially similar floorboard in a vertical direction perpendicular to said surface layer and in a horizontal direction perpendicular to said vertical direction and to said edge portions, wherein the first core layer, closest to the surface layer, comprises HDF or MDF, the second core being a sound absorbing or reducing layer that is arranged above the connectors to be closer to the surface layer than the connectors, and the floorboard has a thickness exceeding 12 mm.

2. The floorboard as claimed in claim 1, wherein the second core layer comprises a wood fiber board material.

3. The floorboard as claimed in claim 2, wherein the surface layer is a direct laminate.

4. The floorboard as claimed in claim 1, wherein said sound absorbing or reducing layer is arranged in an upper part of said floorboard.

5. The floorboard as claimed in claim 4, wherein said sound absorbing or reducing layer comprises rubber or a rubber-like material.

6. The floorboard as claimed in claim 4, wherein said sound absorbing or reducing layer comprises cork.

7. The floorboard as claimed in claim 1, wherein the connectors are mechanical connectors.

8. The floorboard as claimed in claim 1, wherein the connectors are one single continuous piece with the core.

9. The floorboard as claimed in claim 1, wherein the connectors comprise a tongue and a groove for locking the floorboard with the similar floorboard in the vertical direction, and a locking element and a locking groove for locking the floorboard with the similar floorboard in the horizontal direction.

10. The floorboard as claimed in claim 1, wherein the connectors are configured to lock the floorboard with the similar floorboard by inward angling or snapping-in.

\* \* \* \* \*